United States Patent
Ryan (10) Patent No.: US 10,755,056 B2
(45) Date of Patent: Aug. 25, 2020

(54) SYSTEMS AND METHODS FOR TESTING SMART CARD OPERATION

(71) Applicant: Walmart Apollo, LLC, Bentonville, AR (US)

(72) Inventor: Michael Allan Ryan, Rogers, AR (US)

(73) Assignee: Walmart Apollo, LLC, Bentonville, AR (US)

(*) Notice: Subject to any disclaimer, the term of this patent is extended or adjusted under 35 U.S.C. 154(b) by 243 days.

(21) Appl. No.: 15/910,297

(22) Filed: Mar. 2, 2018

(65) Prior Publication Data
US 2018/0253572 A1    Sep. 6, 2018

Related U.S. Application Data

(60) Provisional application No. 62/465,975, filed on Mar. 2, 2017.

(51) Int. Cl.
*G06K 7/00* (2006.01)

(52) U.S. Cl.
CPC .................. *G06K 7/0095* (2013.01)

(58) Field of Classification Search
CPC .. G06K 7/0095; G06K 19/07; G06K 19/0717; G06K 19/077; G06K 19/07732; G06K 19/07739; G06K 7/0013; G06K 7/10465; G06F 11/2294; G06F 11/263
See application file for complete search history.

(56) References Cited

U.S. PATENT DOCUMENTS

| | | | |
|---|---|---|---|
| 5,315,596 A * | 5/1994 | Lee | H04J 3/1641 370/369 |
| 6,096,567 A * | 8/2000 | Kaplan | G01R 31/2887 438/14 |
| 6,618,685 B1 | 9/2003 | Bender et al. | |
| 7,061,263 B1 | 6/2006 | Ong | |
| 7,765,080 B2 | 7/2010 | Ludwig et al. | |
| 7,792,396 B2 | 9/2010 | Kish, Jr. et al. | |
| 8,125,235 B2 | 2/2012 | Hung | |
| 8,356,758 B1 * | 1/2013 | Cok | G06K 19/0717 235/492 |
| 8,484,671 B1 | 7/2013 | Kahn et al. | |
| 8,531,202 B2 | 9/2013 | Mok et al. | |
| 2003/0210031 A1 * | 11/2003 | Miller | G01R 1/07378 324/756.03 |

(Continued)

FOREIGN PATENT DOCUMENTS

WO    2014/056118 A1    4/2014

OTHER PUBLICATIONS

International Search Report and Written Opinion for Application No. PCT/US2018/020647, dated May 29, 2018. 10 pages.

(Continued)

*Primary Examiner* — Thien M Le
(74) *Attorney, Agent, or Firm* — McCarter & English, LLP (57) ABSTRACT

Methods and systems are presented for testing smart card operations and functions for multiple smart cards and associated readers. The methods and systems use a multiplexer and a demultiplexer to connect smart card sockets to probe cards that can be inserted into smart card readers using actuators. The methods and systems described herein test a response of a selected smart card reader or terminal connected to the smart card reader to insertion of the probe card.

20 Claims, 6 Drawing Sheets

(56) References Cited

U.S. PATENT DOCUMENTS

| | | | | |
|---|---|---|---|---|
| 2004/0250191 A1* | 12/2004 | Learning | ............... | G06F 11/263 |
| | | | | 714/742 |
| 2006/0267611 A1* | 11/2006 | Corcoran | ............ | G06F 11/2294 |
| | | | | 324/754.1 |
| 2009/0114714 A1* | 5/2009 | Huang | ................... | G06Q 10/08 |
| | | | | 235/376 |
| 2010/0025480 A1* | 2/2010 | Nishizawa | ........... | G06K 19/077 |
| | | | | 235/492 |
| 2016/0069931 A1* | 3/2016 | Olivier | ................. | G01R 1/0408 |
| | | | | 340/514 |

OTHER PUBLICATIONS

Keolabs, Smart Card Testing Platforms. Retrieved online at: http://www.keolabs.com/smart-card-testing.html. Nov. 14, 2016. 5 pages.

* cited by examiner

> Receive an identifier for a selected one of a plurality of smart card sockets capable of receiving a smart card and an identifier for a selected one of a plurality of probe cards, each probe card capable of insertion into one of a plurality of smart card readers, each smart card reader connected to one of a plurality of terminals
> 502

> Send, using a microcontroller, a binary address corresponding to the identifier for the selected one of the plurality of smart card sockets to a multiplexer, the multiplexer having a plurality of multiplexer inputs and a plurality of multiplexer outputs, each one of the plurality of multiplexer inputs in a same portion of the multiplexer is connected to a same smart card contact type on a different one of the plurality of smart cards sockets
> 504

> Send, using the microcontroller, a binary address corresponding to the identifier for the selected one of the plurality of probe cards to a demultiplexer, the demultiplexer having a plurality of demultiplexer outputs and a plurality of demultiplexer inputs, each one of the demultiplexer outputs is connected to a same probe card contact type on a different one of the plurality of probe cards, each demultiplexer input is connected to a multiplexer output
> 506

> Activate one of a plurality of actuators that is engaged to the selected one of the probe cards to insert the selected one of the plurality of probe cards into a selected one of the plurality of smart card readers to test a response of the selected one of the smart card readers or a response of a selected one of the plurality of terminals connected to the selected one of the smart card readers
> 508

SYSTEMS AND METHODS FOR TESTING SMART CARD OPERATION

RELATED APPLICATIONS

This application claims priority to U.S. Provisional Patent Application No. 62/465,975, filed Mar. 2, 2017, the entire contents of which is incorporated herein by reference.

BACKGROUND

Chip-enabled smart cards and associated readers and systems are evolving at a rapid pace, and this evolution can create a lack of interoperability between the cards and systems designed to read the cards.

BRIEF DESCRIPTION OF DRAWINGS

Illustrative embodiments are shown by way of example in the accompanying drawings and should not be considered as a limitation of the present disclosure:

FIG. 5 illustrates a flowchart of a process for testing smart card operation according to embodiments of the present disclosure.

DETAILED DESCRIPTION

Described in detail herein are methods and systems for testing smart card operation for multiple smart cards and associated readers. The methods and systems use a multiplexer and a demultiplexer to electrically connect smart cards inserted into smart card sockets with probe cards that can be inserted into smart card readers using actuators. The smart cards do not move during testing once they are received in the smart card sockets. The actuators move the probe cards over short distances to electrically connect and disconnect probe cards with smart card readers thus providing high reliability of card insertion. The methods and systems described herein allow rapid testing of the compatibility of smart card reader systems with a variety of current and legacy smart cards to ensure that smart cards having different characteristics are properly readable by smart card readers and terminals connected thereto. In some embodiments, systems and methods described herein methodically step through all possible combinations of smart card sockets and probe cards to electrically connect, one at a time in series, each smart card socket to each probe card.

Generally, smart card readers and terminals have updateable firmware and software. When an update to the firmware or software of one of these components is created, the updated firmware or software may inadvertently introduce compatibility issues with current or legacy smart cards in general circulation. Deployment of updated firmware or hardware across an entire network can impact large numbers of transactions, and fixing problems associated with updated firmware or software that have caused compatibility issues with certain smart cards costs time, money, and resources and reduces the customer's level of trust. Therefore, testing the compatibility of smart card reading systems with a variety of smart cards before the systems are widely deployed is paramount.

When testing compatibility of smart cards and smart card enabled or related products, physical insertion of the smart card is an important part of the testing process. Systems that test smart card compatibility using a "virtual" insertion rather than an actual card insertion require additional modification to use "virtual" insertion and thus do not exactly represent systems used in actual commerce. As such, systems that use "virtual" insertion can undesirably produce different compatibility results than systems that use actual card insertion. For example, testing smart card readers compliant with the ISO/IEC 7816 standard by physically inserting the smart card ensures that all communication and encryption among the embedded integrated circuit in the smart card, the smart card reader, the terminal, and the smart card authorizer happens successfully. Testing such a system using "virtual" insertion can hide communication or encryption/decryption issues that can exist in the physical hardware. In addition, performance testing using physical insertion subjects the system to more realistic processing delays than in a "virtualized" system.

Previously, a robotic arm was used to select a smart card from a location in a container or on a peg board. The robotic arm would then aim and insert the smart card into the smart card reader. After the necessary testing of the card was performed, the robotic arm removed the card and placed it back in its original location. During repetition of this cycle for different smart cards, disruptions in testing were common due to mishandling of the card by the arm or improper replacement of the card in the card's location. For example, the robotic arm was prone to dropping the card or mislocating the card upon return to the card's original location such that the card was not retrievable during subsequent tests. In addition, the large-scale movements of the arm necessary to access different smart cards was time-consuming, thus extending the time necessary to perform a complete test of all smart cards and smart card types. Systems and methods taught herein can significantly reduce the time required to complete a test of a smart card and associated smart card system. For example, systems and methods described herein can complete a course of testing with low failure rate in 20 seconds wherein the same course of testing would previously have taken 2 minutes to complete with higher failure rate by use of the robotic arm.

As used herein, a "smart card" is any portable card having embedded integrated circuits.

As used herein, a "smart card socket" is a device capable of making electrical connections with the embedded integrated circuits of the smart card but lacking the software and hardware necessary to validate the smart card. Examples of smart card sockets can be found as components in full commercial point-of-sale systems or can be a bare slot to receive the smart card having the necessary electrical connections to connect to electrical contacts of the smart card.

As used herein, a "probe card" is a test card that does not include programming or software in and of itself. An example of a probe card can include a blank card with electrical contacts that are arranged to be read by a reader.

As used herein, a "smart card reader" is a device capable of making electrical connections with the electrical contacts of the probe card. Examples of smart card readers can include full commercial point-of-sale systems.

Figure 1:
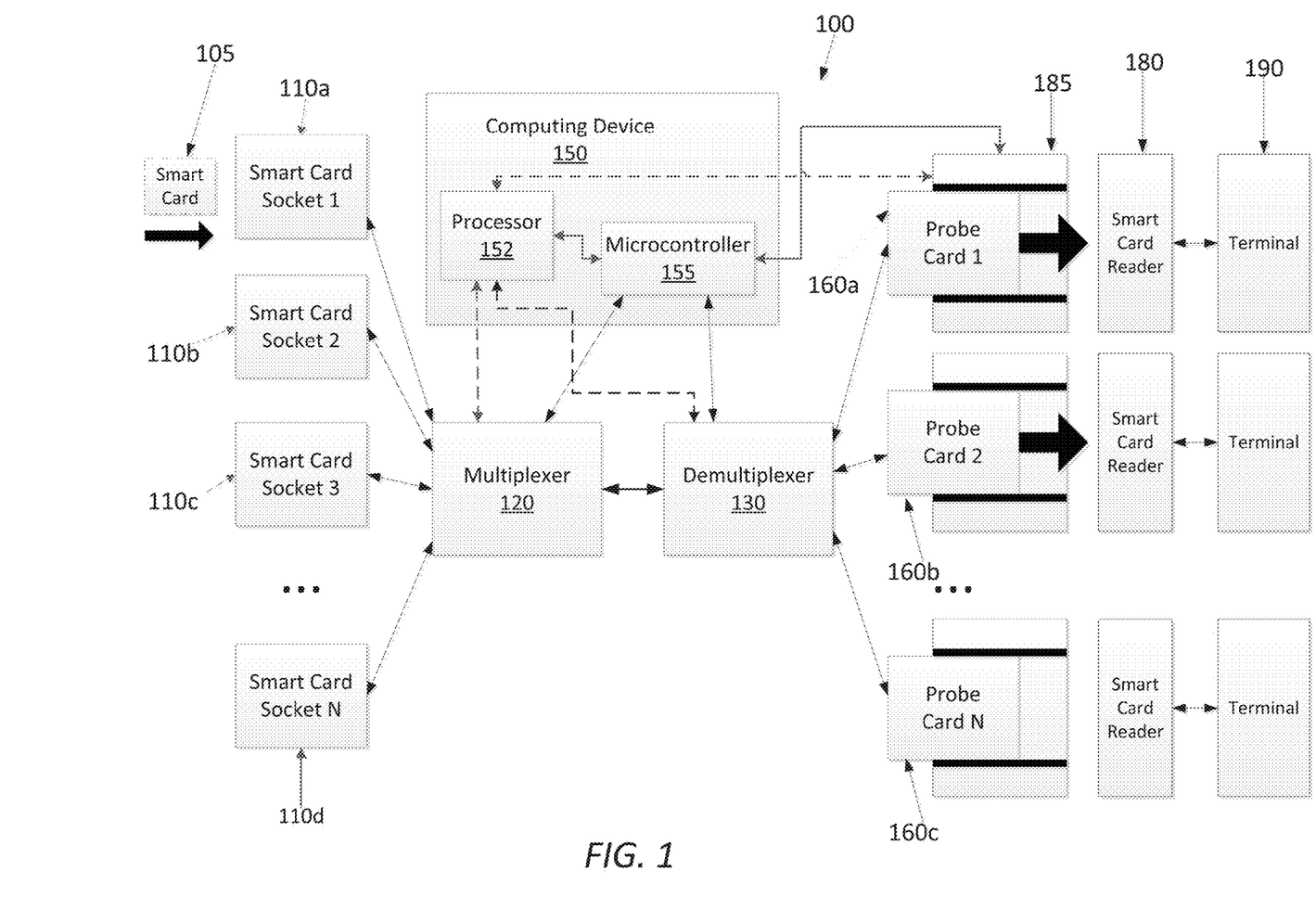
FIG. 1 illustrates a block diagram of a system for testing smart card operation according to embodiments of the present disclosure.

FIG. 1 illustrates a block diagram of a system 100 for testing smart card operations. The system 100 can include a plurality of smart card sockets 110a-d that are each capable of receiving a smart card 105. The system 100 can also include a plurality of probe cards 160a-c that are each capable of being inserted into one of a plurality of smart card readers 180 that are each connected to a different terminal 190. The smart card sockets 110a-d and probe cards 160a-c can be communicatively coupled via a multiplexer 120 and a demultiplexer 130. A computing device 150 equipped with a processor 152 and a microcontroller 155 can receive identifiers for a selected smart card socket 110a-d and a selected probe card 160a-c and can send a binary address corresponding to the selected smart card socket 110a-d to the multiplexer 120 and a binary address corresponding to the selected probe card 160a-c to the demultiplexer 130. The computing device 150 can use the microcontroller 155 to activate an actuator 185 engaged with the selected probe card 160 to insert and remove the probe card at a selected smart card reader 180. The system 100 can be used to rapidly test smart card operations and interoperability between smart cards, smart card readers, and terminals.

Figure 2:
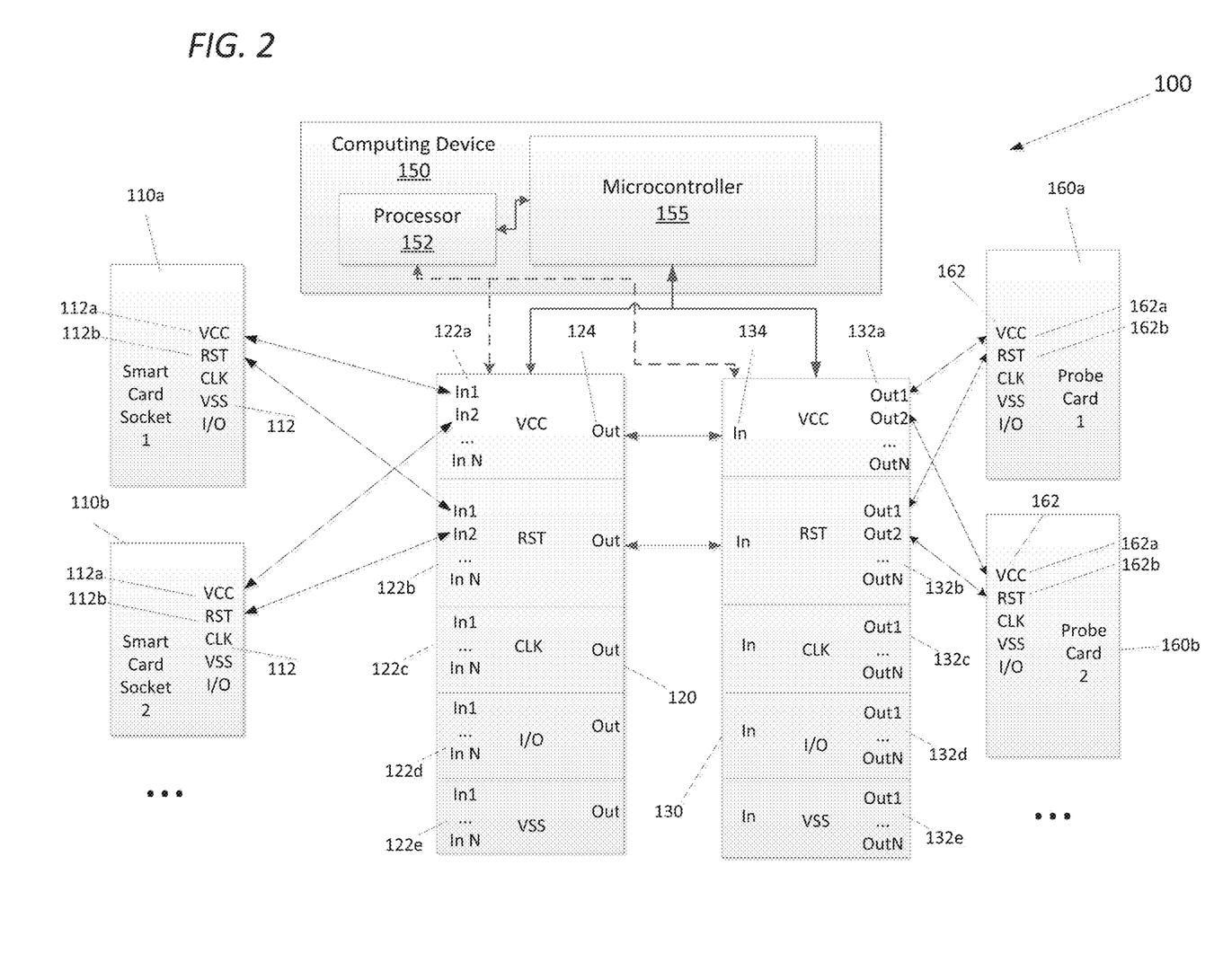
FIG. 2 illustrates an exemplary block diagram of components of the system of FIG. 1.

The smart card sockets 110a-d are capable of receiving a variety of smart cards 105 and smart card types. When the smart card 105 is inserted into one of the smart card sockets 110a-d, it can remain inserted and engaged with the smart card socket 110a-d for the duration of testing and does not move. Each smart card socket 110a-d can include a plurality of smart card contacts 112 (as shown in FIG. 2) that can be electrically connected with multiplexer inputs 122a-e on the multiplexer 120 as described in greater detail below. In some embodiments, the smart card sockets 110a-d can receive a Chip and PIN card (i.e., a smart card with dual authentication in the form of a chip and a numerical PIN input by a user), a Chip and Signature card (i.e., a smart card with dual authentication in the form of the chip and a signature of a user), or a card conforming to the Europay, MasterCard, Visa (EMV) standard. For example, the smart card sockets 110a-d can be capable of receiving a smart card 105 conforming to any of the VIS (Visa), MasterCard chip (MasterCard), American Express Integrated Circuit Card Payment Specification (AEIPS; American Express), UICS (China Union Pay), J Smart (JCB), or D-PAS (Discover) implementation standards. In other embodiments, the smart card sockets 110a-d can be capable of receiving subscriber identification module (SIM) smart cards 105. In some embodiments, a first smart card socket 110a and a second smart card socket 110b are capable of receiving different varieties of smart cards 105. In an exemplary embodiment, the system 100 can include up to sixteen smart card sockets 110a-d but can have fewer or more smart card sockets 110a-d.

As illustrated in FIG. 2, probe cards 160a-c can include a plurality of probe card contacts 162 that can be electrically connected to demultiplexer outputs 132a-e of the demultiplexer 130 as described in greater detail below. The plurality of actuators 185 can each be engaged with one of the probe cards 160a-c to insert and remove the probe card 160a-c at the corresponding smart card reader 180. In some embodiments, the actuator 185 can provide a linear motion of between 2 and 5 mm, up to 5 mm, or up to 10 mm. In some embodiments, the actuator 185 can move the probe card 160a-c by a distance sufficient to engage and disengage the probe card with electrical contacts of the smart card reader 180. For example, the probe cards 160a-c can be at least partially inserted into a physical receiving slot of the smart card readers 180, and the motion of the actuator 185 can be sufficient to electrically connect and disconnect the probe card contacts 162 with electrical contacts in the smart card reader 180. Such an arrangement advantageously reduces aiming error because the probe card 160a-c can be guided by the contours of the physical receiving slot of the smart card reader 180. In addition, moving the probe card 160a-c by a short distance to achieve insertion and removal is faster than full insertion and removal of the probe card 160a-c from the smart card reader 180. In an exemplary embodiment, the system 100 can include up to four probe cards 160a-c but is not limited to four probe cards 160a-c. In some embodiments, each probe card 160a-c can be electrically connected one at a time and in series to each smart card socket 110a-d using the multiplexer 120 and demultiplexer 130 as described in greater detail below.

The interaction of the probe card 160a-c and the smart card readers 180 is meant to simulate the interaction of a smart card with the smart card reader 180. The use of the probe card 160a-c and the smart card readers 180 avoids the difficulties discussed above with respect to use of a robotic arm to insert various smart cards into smart card readers. The probe card 160a-c and the smart card readers 180 in combination with the multiplexer 120 and demultiplexer 130 allow a type of smart card to be tested across multiple types of smart card readers or terminals without the need to have a robotic arm move the smart card to multiple different smart card readers in order to simulate and test compatibility of the smart card across a variety of terminal types or different versions of a like type of a terminal.

The multiplexer 120 can have a plurality of multiplexer inputs 122a-e and a plurality of multiplexer outputs 124. A block diagram of an exemplary multiplexer 120 is illustrated in detail in FIG. 2. The multiplexer 120 can selectively electrically connect one of the plurality of multiplexer inputs 122a-e to each of the plurality of multiplexer outputs 124. In some embodiments, the multiplexer 120 can receive a binary address corresponding to a selected smart card socket 110a-d as described in greater detail below. In such a case, the multiplexer 120 can connect the multiplexer outputs 124 to the subset of the plurality of multiplexer inputs 122a-e that correspond to the selected smart card socket 110a-d.

For purposes of clarity, FIG. 2 shows example electrical connections between a subset of smart card contacts 112 and multiplexer inputs 122a-b. However, one of ordinary skill in the art would understand that electrical connections between other smart card contacts 112 than those explicitly illustrated and multiplexer inputs 122a -122e would be made in a similar fashion to those shown. In some embodiments, each one of the plurality of multiplexer inputs 122a-e in a same portion of the multiplexer is electrically connected to a same smart card contact type 112a, 112b on a different one of the plurality of smart card sockets 110a-d. In accordance with various embodiments, the smart card contact types 112a-b can be one of positive voltage, negative voltage, ground, clock, reset, or input/output. For example, FIG. 2 illustrates each of the plurality of multiplexer inputs 122a labeled In1 . . . InN on the $V_{cc}$ portion of the multiplexer 120 as coupled to a smart card contact 112 of type $V_{cc}$ 112a on a different one of the plurality of smart card sockets 110a-b (i.e., smart card sockets 1 through N). Similarly, each of the plurality of multiplexer inputs 122b labeled In1 . . . InN on the RST portion of the multiplexer 120 can be connected to a smart card contact 112 of type RST 112b on a different one of the plurality of smart card sockets 110a-b (i.e., smart card sockets 1 through N). One of ordinary skill in the art would recognize that the multiplexer inputs 122c, 122d, 122e on the CLK, I/O, and $V_{ss}$ portions of the multiplexer 120 can be connected to smart card contact types of CLK, I/O, and $V_{ss}$, respectively, on a different one of the plurality of smart card sockets 110a-b.

The demultiplexer 130 has a plurality of demultiplexer outputs 132a-e and a plurality of demultiplexer inputs 134. A block diagram of an exemplary demultiplexer 130 is illustrated in detail in FIG. 2. The demultiplexer 130 can act to electrically connect one of the plurality of demultiplexer outputs 132a-e to each of the plurality of demultiplexer inputs 134. In some embodiments, the demultiplexer 130 can receive a binary address corresponding to a selected probe card 160a-c as described in greater detail below. In such a case, the demultiplexer 130 can connect the demultiplexer inputs 124 to the subset of the plurality of demultiplexer outputs 132a-e that correspond to the selected probe card 160a-c.

For purposes of clarity, FIG. 2 shows example connections between a subset of probe card contacts 162 and demultiplexer outputs 132a-e. However, one of ordinary skill in the art would understand that electrical connections between probe card contacts 162 other than those explicitly shown and demultiplexer outputs 132a-e would be made in a similar fashion to those shown. In some embodiments, each one of the plurality of demultiplexer outputs 132a-e in a same portion of the demultiplexer is connected to a same probe card contact type 162a-b on a different one of the plurality of probe cards 160a-b. In accordance with various embodiments, the probe card contact types 162a-b can be one of positive voltage, negative voltage, ground, clock, reset, or input/output. For example, FIG. 2 illustrates each of the plurality of demultiplexer outputs 132a labeled Out1 . . . OutN on the $V_{cc}$ portion of the demultiplexer 130 as coupled to a probe card contact 162 of type $V_{cc}$ 162a on a different one of the plurality of probe cards 160a-b (i.e., probe cards 1 through N). Similarly, each of the plurality of demultiplexer outputs 132b labeled Out1 . . . OutN on the RST portion of the demultiplexer 130 can be connected to a probe card contact 162 of type RST 162b on a different one of the plurality of probe cards 160a-b. One of ordinary skill in the art would recognize that the demultiplexer inputs 132c, 132d, 132e on the CLK, I/O, and $V_{cc}$ portions of the demultiplexer 130 can be connected to probe card contact types of CLK, I/O, and $V_{ss}$, respectively, on a different one of the plurality of probe cards 160a-b.

In accordance with various embodiments, each multiplexer output 124 can be connected to a demultiplexer input 134. In some embodiments, each multiplexer output 124 corresponds to the subset of multiplexer inputs 122a-e that is connected to a particular smart card contact type 112a-b. Similarly, each demultiplexer input 134 can correspond to the subset of demultiplexer outputs 132a-e that is connected to a particular probe card contact type 162a-b. In some embodiments, the multiplexer output 124 corresponding to inputs 122a-e connected to a particular smart card contact type 112a-b are connected to the demultiplexer input 134 corresponding to outputs 132a-e connected to a particular probe card contact type 162a-b that is the same type as the smart card contact type 112a-b (e.g., $V_{cc}$, RST, CLK, I/O, $V_{ss}$). For example, the multiplexer output 124 of the $V_{cc}$ portion of the multiplexer 120 can be connected to the demultiplexer input 134 of the $V_{cc}$ portion of the demultiplexer 130.

The computing system 150 can include the processor 152 and, in some embodiments, the microcontroller 155. In some embodiments, the microcontroller 155 can have its own central processing unit and memory separate from those of the computing system 150. In some embodiments, the microcontroller 155 can execute instructions as described herein independently of the processor 152 to control and address the multiplexer 120, demultiplexer 130, or actuators 185. In some embodiments, the microcontroller 155 can control or direct all communications between or among the multiplexer 120, demultiplexer 130, and actuators 185 independently of the processor 152. In some embodiments, the microcontroller 155 receives instructions from the processor 152 to perform tasks as described herein. In some embodiments, the processor 152 can communicate directly with and directly control the multiplexer 120, demultiplexer 130, and actuators 185 independent of the microcontroller 155.

In some embodiments, the computing system 150 can receive an identifier for a selected one of the plurality of smart card sockets 110a-d and an identifier for a selected one of the plurality of probe cards 160a-c. For example, a user can identify a selected smart card socket 110a-d and a selected probe card 160a-c to be electrically connected by the system 100. Alternatively, an automated script can identify selected smart card sockets 110a-d and selected probe cards 160a-c to be electrically connected sequentially as part of a testing procedure. For example, the script can identify the first smart card socket 110a and the first probe card 160a to be electrically connected, then the first smart card socket 110a and the second probe card 160b to be electrically connected, and so on until a portion or all of the possible combinations of smart card sockets 110a -110d and probe cards 160a -160c have been identified to be electrically connected. Then, the computing system 150 can use the microcontroller 155 to send a binary address corresponding to the selected smart card socket 110a-d to the multiplexer 120. In some embodiments, the computing system 150 can use the processor 152 to send the binary address corresponding to the selected smart card socket 110a-d to the multiplexer 120. The multiplexer 120 can then electrically connect the subset of multiplexer inputs 122a-e corresponding to that binary address to multiplexer outputs 124. The computing system 150 can also use the microcontroller 155 to send a binary address corresponding to the selected probe card 160a-c to the demultiplexer 130. In some embodiments, the computing system 150 can instead use the processor 152 to send the binary address corresponding to the selected probe card 160a-c to the demultiplexer 130. The demultiplexer 130 can then electrically connect the subset of demultiplexer outputs 132a-e corresponding to that binary address to demultiplexer inputs 134.

The computing system 150 can also use the microcontroller 155 to activate the actuator 185 that is engaged to the selected one of the plurality of probe cards 160a-c to insert the selected probe card 160a-c into a selected one of the smart card readers 180. In some embodiments, the computing system 150 can use the processor 152 to activate the actuator 185. This sequence of actions can electrically connect the selected smart card socket 110a-d to the selected probe card 160a-c and physically engage the selected probe card 160a-c with the selected smart card reader 180 to test a response of the selected smart card reader 180 or a terminal 190 connected to the selected smart card reader 180. In some embodiments, only one smart card socket 110 and one probe card 160 are electrically connected at any given time. In some embodiments, at least a portion of each probe card 160a-c is always partially inserted into the physical receiving slot of the smart card reader 180. In such an embodiment, the actuator 185 can actuate travel over a short distance to electrically connect and disconnect the probe card contacts 162 with electrical contacts of the smart card reader 180 with minimal aiming error as the card is already partially inserted into the receiving slot of the smart card reader 180.

The smart card readers 180 can include electrical connections positioned to engage with probe card contacts 162 on one of the plurality of probe cards 160. When the computing device 150 electrically connects the selected smart card socket 110a-d to the selected probe card 160a-c and inserts the probe card 160a-c into the smart card reader 180 as described above, the electrical connection can appear to the smart card reader 180 as though the smart card 105 received in the selected smart card socket 110a-d is physically inserted into the smart card reader 180. In some embodiments, the smart card reader 180 can include a firmware. When updates occur to the firmware of the smart card reader 180, systems and methods described herein can test a plurality of smart cards 105 received in a plurality of smart card sockets 110a-d to ensure compatibility between the smart cards 105 and the updated firmware of the smart card reader 180.

In some embodiments, each smart card reader 180 is connected to one of a plurality of terminals 190. In some embodiments, the smart card reader 180 and a connected terminal 190 are physically housed together in a single unit. In other embodiments, the smart card reader 180 and the connected terminal 190 can be physically separated or connected through a communications platform 660 as described below with reference to FIG. 6. Exemplary terminals 190 can include, for example, point-of-sale devices or cash registers. In some embodiments, the terminal 190 can include, for example, point-of-sale devices manufactured or sold by Ingenico Group, NCR Corporation, or VeriFone Systems, Inc. In some embodiments, the terminal 190 can include a firmware. When updates occur to the firmware of the terminal 190, systems and methods described herein can test a plurality of smart cards 105 received in a plurality of smart card sockets 110a-d to ensure compatibility between the smart cards 105 and the updated firmware of the terminal 190.

Figure 3:
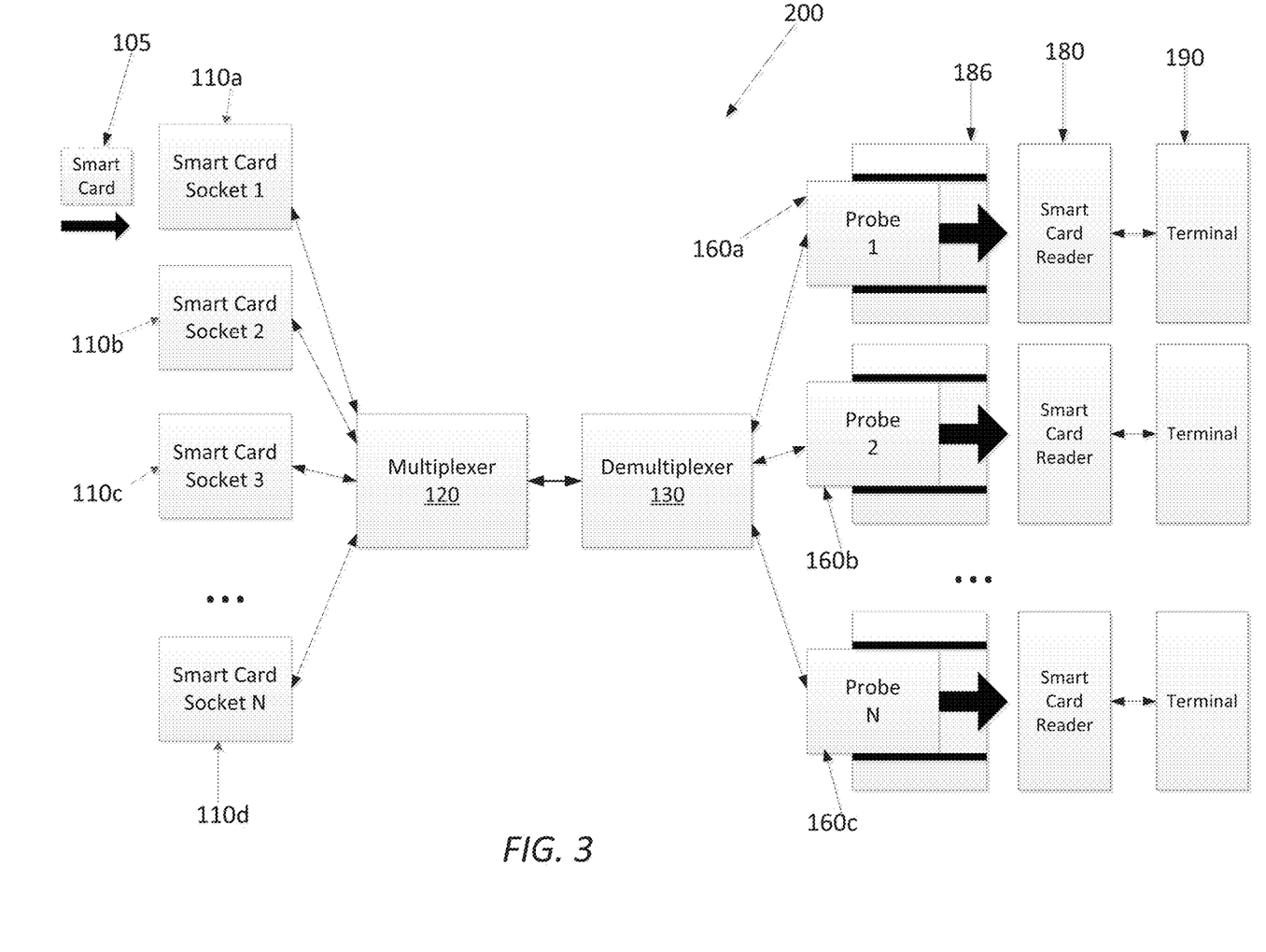
FIG. 3 illustrates a block diagram of a device for testing smart card operation in accordance with embodiments of the present disclosure.

FIG. 3 illustrates a device 200 for testing smart card operation in accordance with various embodiments of the present disclosure. In some embodiments, the device 200 can include the elements of the system 100 described above with reference to FIG. 1 less the computing device 150 including the microcontroller 155. The device 200 can include a plurality of smart card sockets 110a-d, a plurality of probe cards 160a-c, and a plurality of smart card readers 180 each connected to one of a plurality of terminals 190. The device 200 can include at least one multiplexer 120 and at least one demultiplexer 130. In some embodiments, the multiplexer 120 and demultiplexer 130 are configured to be controllable by a separately provided computing system, microcontroller, or server. Each probe card can be engaged with one of a plurality of linear actuators 186. Using the demultiplexer 130 and the multiplexer 120, one of the smart card sockets 110a-d can be electrically connected to one of the probe cards 160a-c. When a smart card 105 is received in the smart card socket 110a-d and the probe card 160a-c is inserted into the smart card reader 180 using the linear actuator 186, the electrical connection between the probe card 160a-c and the smart card socket 110a-d can make it appear to the smart card reader 180 as though a smart card 105 has been physically inserted into the smart card reader 180.

Figure 4:
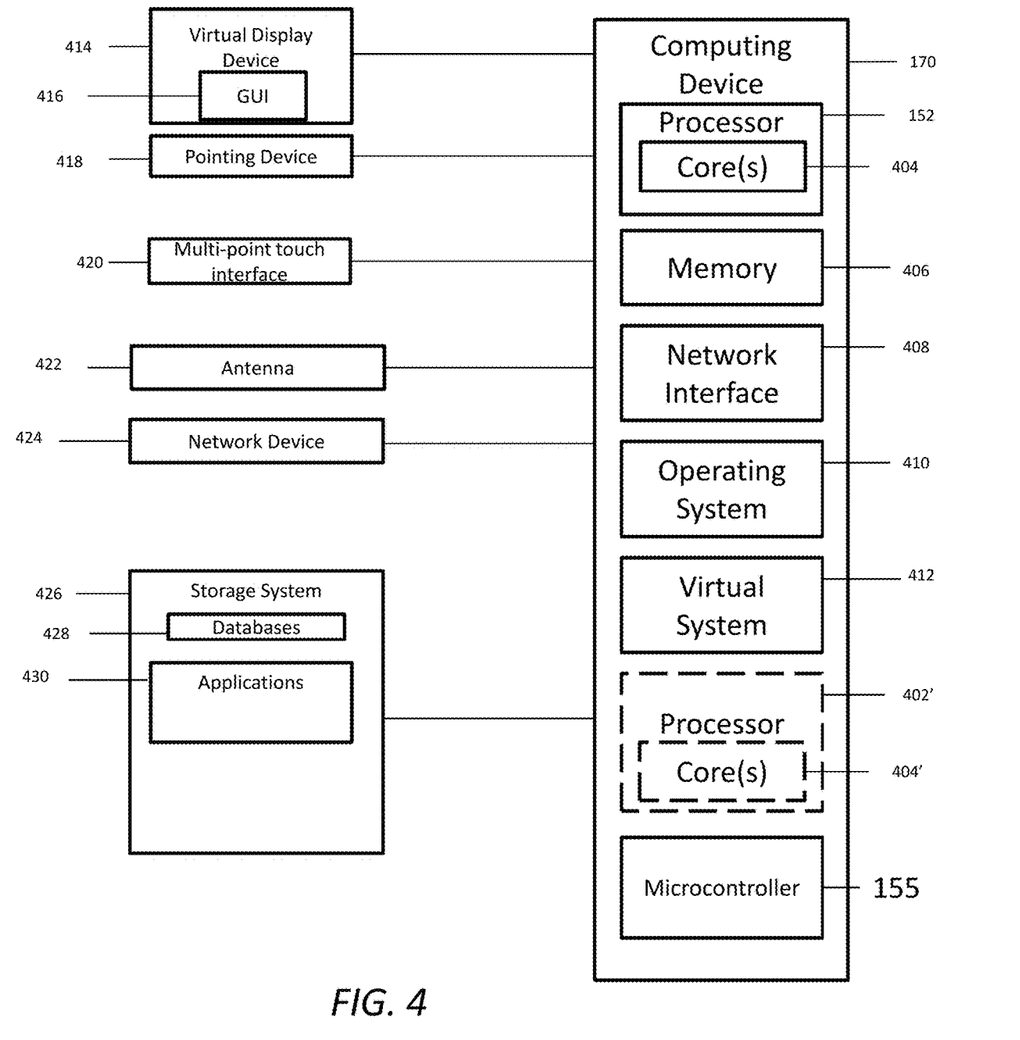
FIG. 4 illustrates an exemplary computing device for use with systems and methods disclosed herein.

FIG. 4 is a block diagram of the example computing device 150 for implementing exemplary embodiments of the present disclosure. The computing device 150 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 150 may store computer-readable and computer-executable instructions or software (e.g., applications 430) for implementing exemplary operations of the computing device 150. The computing device 150 also includes configurable and/or programmable processor 152 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 152 and processor(s) 402' may each be a single core processor or multiple core (404 and 404') processor. Either or both of processor 152 and processor(s) 402' may be configured to execute one or more of the instructions described in connection with computing device 150.

Virtualization may be employed in the computing device 150 so that infrastructure and resources in the computing device 150 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 150 through a visual display device 414, such as a computer monitor, which may display one or more graphical user interfaces 416, multi touch interface 420 and a pointing device 418.

The computing device 150 may also include one or more storage devices 426, such as a hard-drive, CD-ROM, or other computer readable media, for storing data and computer-readable instructions and/or software that implement exemplary embodiments of the present disclosure (e.g., applications). For example, exemplary storage device 426 can include one or more databases 428 for storing information such as the binary address associated with each smart card socket 110 or probe card 160. The databases 428 may be updated manually or automatically at any suitable time to add, delete, and/or update one or more data items in the databases.

The computing device 150 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 150 and a network and/or between the computing device 150 and other computing devices. The network interface 408 may include a built-in network adapter, network interface card, PCMCIA network card, card bus network adapter, wireless network adapter, USB network adapter, modem or any other device suitable for interfacing the computing device 150 to any type of network capable of communication and performing the operations described herein.

The computing device 150 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 150 and performing the operations described herein. In exemplary embodiments, the operating system 410 may be run in native mode or emulated mode. In an exemplary embodiment, the operating system 410 may be run on one or more cloud machine instances.

FIG. 5 illustrates an exemplary flowchart of a method 501 of testing smart card operations and functions. The method includes receiving an identifier for a selected one of a plurality of smart card sockets capable of receiving a smart card and an identifier for a selected one of a plurality of probe cards (step 502). Each probe card is capable of insertion into one of a plurality of smart card readers, and each smart card reader is connected to one of a plurality of terminals. In various embodiments, the identification of the selected smart card socket and probe card can be made by a user or by automated routine as described above with reference to FIGS. 1 and 2. The method also includes sending, using a microcontroller, a binary address corresponding to the identifier for the selected one of the plurality of smart card sockets to a multiplexer (step 504). The multiplexer has a plurality of multiplexer inputs and a plurality of multiplexer outputs. Each one of the plurality of multiplexer inputs in a same portion of the multiplexer is electrically connected to a same smart card contact type on a different one of the plurality of smart card sockets. In some embodiments, the computing device 150 can use a microcontroller 155 to send the binary address to the multiplexer 120 as described above with reference to FIGS. 1 and 2.

The method includes sending, using the microcontroller, a binary address corresponding to the identifier for the selected one of the plurality of probe cards to a demultiplexer (step 506). The demultiplexer has a plurality of demultiplexer outputs and a demultiplexer input, and each one of the demultiplexer outputs in a same portion of the demultiplexer is electrically connected to a same probe card contact type on a different one of the plurality of probe cards. In addition, each demultiplexer input is electrically connected to a multiplexer output. In some embodiments, the computing device 150 can use a microcontroller 155 to send the binary address to the demultiplexer 130 as described above with reference to FIGS. 1 and 2. The method also includes activating one of a plurality of actuators that is engaged to the selected one of the probe cards to insert the selected one of the plurality of probe cards into a selected one of the plurality of smart card readers to test a response of the selected one of the smart card readers or a response of a selected one of the plurality of terminals connected to the selected one of the smart card readers (step 508). For example, the computing device 150 can use the microcontroller 155 to activate the actuator 185 engaged with a probe card 160 to insert the probe card 160 into a smart card reader 180.

Figure 6:
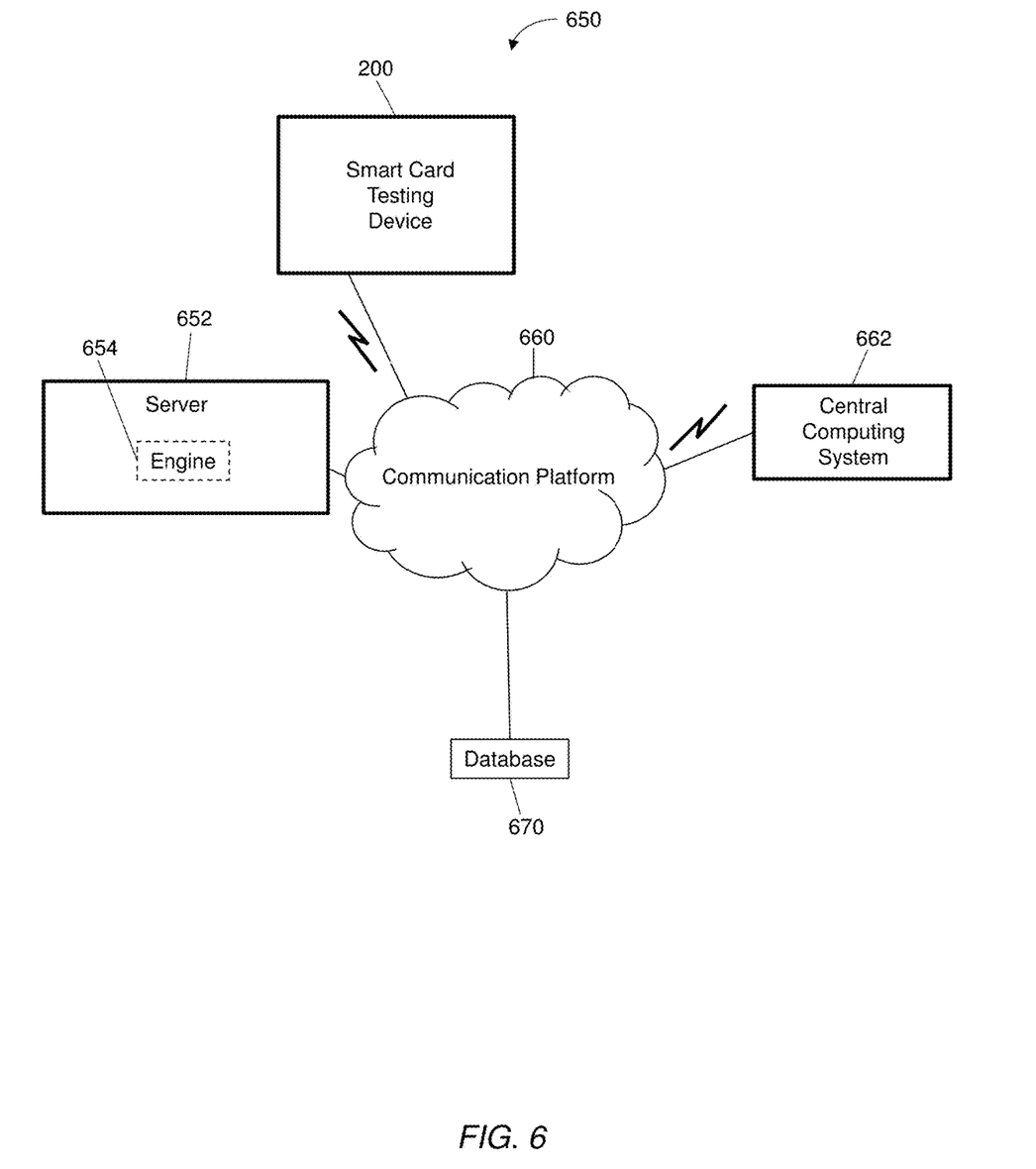
FIG. 6 illustrates a block diagram of an exemplary smart card testing environment in accordance with embodiments of the present disclosure.

FIG. 6 is a block diagram of an exemplary distributed smart card testing environment 650 in accordance with exemplary embodiments of the present disclosure. The environment 650 can include a server 652 configured to be in communication with the smart card testing device 200 or the system 100 or both via a communication platform 660, which can be any network over which information can be transmitted between devices communicatively coupled to the network. For example, the communication platform 660 can be the Internet, Intranet, virtual private network (VPN), wide area network (WAN), local area network (LAN), and the like. In some embodiments, the communication platform 660 can be part of a cloud environment. The environment 650 can include a central computing system 662, which can be in communication with the server 652 and the smart card testing device 200 via the communication platform 660. The environment 650 can include at least one repository or database 670, which can be in communication with the server 652, the smart card testing device 200, and the central computing system 662 via the communications platform 660.

In exemplary embodiments, the server 652, central computing system 662, and databases 670 can be implemented as computing devices (e.g., computing device 150) or terminals (i.e., terminal 190). Those skilled in the art will recognize that the database 670 can be incorporated into the server 652 such that the server 652 can include the database 670. In some embodiments, the database 670 can implemented as previously described with reference to FIG. 4 (i.e., database 428). In some embodiments, the database 670 can store the results of smart card testing, binary addresses for each smart card socket 110*a-d* or probe card 160*a-c*, or computer-executable instructions or automated scripts that describe a smart cart testing sequence. In some embodiments, the server 652 can include one or more engines 654. In some embodiments, the central computing system 662 can interface with the server 652 to execute instances of the engine 654 to perform one or more processes described herein including, e.g., identifying selected smart card sockets 110*a-d* and selected probe cards 160*a-c* to be electrically connected and testing the smart card 105 inserted into the selected smart card socket 110*a-d* for compatibility with the corresponding smart card reader 180 or terminal 190 or related functions.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art recognizes that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for testing smart card operation comprising:
a plurality of smart card sockets, each smart card socket capable of receiving a smart card;
a plurality of probe cards, each probe card capable of insertion into one of a plurality of smart card readers, each smart card reader connected to one of a plurality of terminals;
at least one multiplexer having a plurality of multiplexer inputs and a plurality of multiplexer outputs, each one of the plurality of multiplexer inputs in a same portion of the multiplexer is electrically connected to a same smart card contact type on a different one of the plurality of smart card sockets;
at least one demultiplexer having a plurality of demultiplexer outputs and a plurality of demultiplexer inputs, each one of the plurality of demultiplexer outputs in a same portion of the demultiplexer is electrically connected to a same probe card contact type on a different one of the plurality of probe cards, each demultiplexer input is electrically connected to a multiplexer output;
a plurality of actuators, each actuator engaged with a different one of the plurality of probe cards; and
a computing system equipped with a processor and a microcontroller, the computing system engaged with the plurality of actuators,
the computing system is configured to:
receive an identifier for a selected one of the plurality of smart card sockets and an identifier for a selected one of the plurality of probe cards;
send, using the microcontroller, a first binary address corresponding to the identifier for the selected one of the plurality of smart card sockets to the at least one multiplexer;
send, using the microcontroller, a second binary address corresponding to the identifier for the selected one of the plurality of probe cards to the at least one demultiplexer; and
activate the actuator that is engaged to the selected one of the plurality of probe cards to insert the selected one of the plurality of probe cards into a selected one of the plurality of smart card readers to test a response of the selected one of the smart card readers or a response of a selected one of the plurality of terminals connected to the selected one of the smart card readers.

2. The system of claim 1, wherein the computing system is further configured to validate a smart card engaged with the smart card socket that corresponds to the identifier for the one of the plurality of smart card sockets.

3. The system of claim 1, wherein at least two of the plurality of terminals operate using different firmware or different versions of firmware.

4. The system of claim 1, wherein at least two of the plurality of smart card readers operate using different firmware or different versions of firmware.

5. The system of claim 1, wherein the plurality of smart card sockets comprises sixteen smart card sockets.

6. The system of claim 1 wherein the plurality of probe cards comprises four probe cards.

7. The system of claim 1 wherein the smart card contact type is one of positive voltage, negative voltage, reset, clock, or input/output.

8. The system of claim 1, wherein each smart card is an EMV card.

9. The system of claim 1 wherein each smart card is a subscriber identification module (SIM) card.

10. A method of testing smart card operation comprising:
receiving an identifier for a selected one of a plurality of smart card sockets capable of receiving a smart card and an identifier for a selected one of a plurality of probe cards, each probe card capable of insertion into one of a plurality of smart card readers, each smart card reader connected to one of a plurality of terminals;
sending, using a microcontroller, a first binary address corresponding to the identifier for the selected one of the plurality of smart card sockets to a multiplexer, the multiplexer having a plurality of multiplexer inputs and a plurality of multiplexer outputs, each one of the plurality of multiplexer inputs in a same portion of the multiplexer is electrically connected to a same smart card contact type on a different one of the plurality of smart card readers;
sending, using the microcontroller, a second binary address corresponding to the identifier for the selected one of the plurality of probe cards to a demultiplexer, the demultiplexer having a plurality of demultiplexer outputs and a plurality of demultiplexer inputs, each one of the demultiplexer outputs in a same portion of the demultiplexer is electrically connected to a same probe card contact type on a different one of the plurality of probe cards, each demultiplexer input is electrically connected to a multiplexer output; and
activating one of a plurality of actuators that is engaged to the selected one of the probe cards to insert the selected one of the plurality of probe cards into a selected one of the plurality of smart card readers to test a response of the selected one of the smart card readers or a response of a selected one of the plurality of terminals connected to the selected one of the smart card readers.

11. The method of claim 10, further comprising validating a smart card engaged with the smart card socket that corresponds to the identifier for the one of the plurality of smart card sockets.

12. The method of claim 10, wherein at least two of the plurality of terminals operate using different firmware or different versions of firmware.

13. The method of claim 10, wherein at least two of the plurality of smart card readers operate using different firmware or different versions of firmware.

14. The method of claim 10, wherein the plurality of smart card sockets comprises sixteen smart card sockets.

15. The method of claim 10 wherein the plurality of probe cards comprises four probe cards.

16. The method of claim 10 wherein the smart card contact type is one of positive voltage, negative voltage, reset, clock, or input/output.

17. A device for testing smart card operation comprising:
a plurality of smart card sockets, each smart card socket capable of receiving a smart card;
a plurality of probe cards, each probe card capable of insertion into a different one of a plurality of smart card readers, each smart card reader connected to one of a plurality of terminals;
at least one multiplexer having a plurality of multiplexer inputs and a plurality of multiplexer outputs, each one of the plurality of multiplexer inputs in a same portion of the multiplexer is electrically connected to a same smart card contact type on a different one of the plurality of smart card sockets;

at least one demultiplexer having a plurality of demultiplexer outputs and a plurality of demultiplexer inputs, each of the plurality of demultiplexer outputs in a same portion of the demultiplexer is electrically connected to a same probe card contact type on a different one of the plurality of probe cards, each demultiplexer input is electrically connected to a multiplexer output; and a plurality of linear actuators, each linear actuator engaged with a probe card.

18. The device of claim 17, wherein the plurality of smart card sockets comprises sixteen smart card sockets.

19. The device of claim 17 wherein the plurality of probe cards comprises four probe cards.

20. The device of claim 17 wherein the smart card contact type is one of positive voltage, negative voltage, reset, clock, or input/output.

* * * * *